United States Patent

Montagu

[11] Patent Number: 5,225,923
[45] Date of Patent: Jul. 6, 1993

[54] SCANNING MICROSCOPE EMPLOYING IMPROVED SCANNING MECHANISM

[75] Inventor: Jean I. Montagu, Brookline, Mass.

[73] Assignee: General Scanning, Inc., Watertown, Mass.

[21] Appl. No.: 911,192

[22] Filed: Jul. 9, 1992

[51] Int. Cl.$^5$ .................................................. G02B 26/10
[52] U.S. Cl. .................................. 359/199; 250/236; 359/201; 359/213; 359/368
[58] Field of Search ...................... 359/198-199, 359/201-202, 212-217, 223-224, 368, 221; 250/234-236

[56] References Cited

U.S. PATENT DOCUMENTS

| | | | |
|---|---|---|---|
| 3,619,028 | 11/1971 | Keene et al. | 250/236 |
| 4,314,154 | 2/1982 | Minoura et al. | 359/201 |
| 4,370,019 | 1/1983 | Shirasaki | 318/127 |
| 4,631,581 | 12/1986 | Carlsson | 358/93 |
| 4,788,423 | 11/1988 | Cline | 359/201 |
| 4,859,846 | 8/1989 | Burrer | 359/213 |
| 4,874,215 | 10/1989 | Montagu | 310/36 |
| 4,919,500 | 4/1990 | Paulsen | 359/214 |
| 4,959,568 | 9/1990 | Stokes | 359/223 |
| 4,975,626 | 12/1990 | Yagi et al. | 359/198 |
| 5,032,720 | 7/1991 | White | 359/368 |
| 5,048,904 | 9/1991 | Montagu | 359/202 |
| 5,130,838 | 7/1992 | Tanaka et al. | 359/202 |
| 5,144,477 | 9/1992 | White | 359/368 |

OTHER PUBLICATIONS

Montagu, Jean I., "Tunable Resonant Scanners", Proceedings of SPIE—The International Society for Optical Engineering, vol. 817, Aug. 20–21, 1987.

Primary Examiner—Rodney B. Bovernick
Assistant Examiner—James Phan
Attorney, Agent, or Firm—Cesari and McKenna

[57] ABSTRACT

A confocal microscope (10) includes a scanner assembly (38) in which the x-axis deflector assembly includes two resonant scanners (50 and 52) that oscillate about parallel axes at different frequencies, one of which is a harmonic of the other. As a consequence, the x-axis scan can be nearly linear even though it is provided resonantly and thus benefits from the high-speed capabilities of resonant systems. A galvanometer (64) pivots the housing of one of the resonant scanners (50) about its axis so as to provide x-axis panning.

19 Claims, 5 Drawing Sheets

SCANNING MICROSCOPE EMPLOYING IMPROVED SCANNING MECHANISM

BACKGROUND OF THE INVENTION

The present invention concerns scanning microscopes and in particular the mechanisms that they employ for varying the position of the target spot in the object region.

Figure 1:
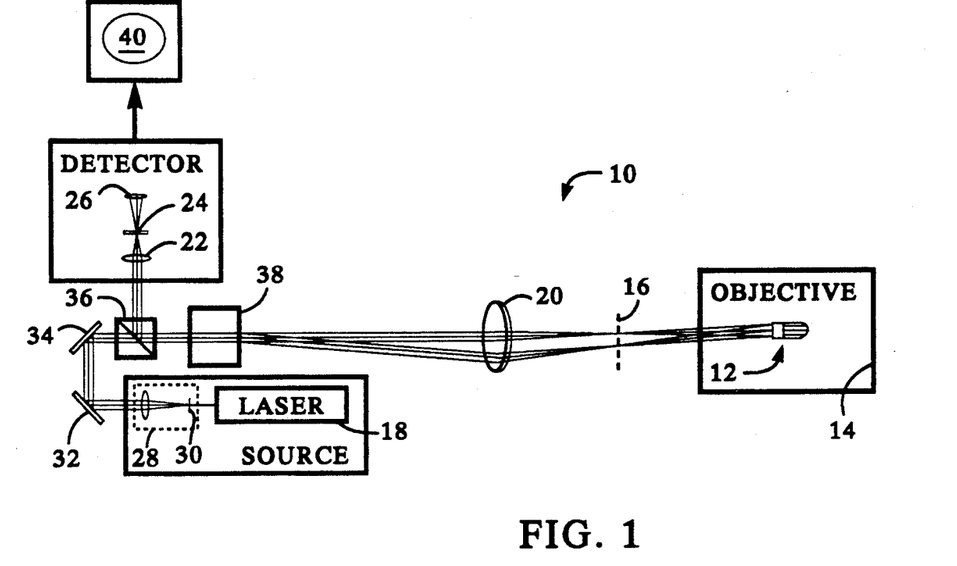
FIG. 1, previously described, is a block diagram of a confocal scanning microscope of a type to which the present invention is directed.

A type of scanning microscope that illustrates aspects of scanning-microscope operation is the confocal microscope depicted in FIG. 1. In that drawing, an objective 12, typically (although not necessarily) of the type employed in a conventional microscope, images an object plane 14 into an image plane 16 in the ordinary manner. In a conventional microscope, of course, the entire viewed portion of the image plane 16 is continually illuminated, and the objective optics must simultaneously keep all parts of the viewed object plane 14 in focus; the conventional microscope can be thought of as processing all picture elements ("pixels") in parallel. As those skilled in the art recognize, this necessitates many compromises that result in optical noise, distortion, and limited resolution. Also, the light from the illumination source must be shared among all regions of the object plane, so any single small part of the viewed object receives only a small fraction of the source's emitted light power.

Microscopes of the scanning type, and in particular confocal microscopes, reduce these conventional-microscope limitations. The light source, typically a laser 18, transmits light through a path that includes a scan lens 20, which focuses nearly the entire laser output into a small point in the image plane, which in turn is conjugate to a correspondingly small target spot in the object plane 14. Consequently, the laser illuminates only a small target spot in the object plane 14 at any one time. Nearly the entire laser output power is therefore delivered to a single target spot, which, because of the scan lens 20 and another, detector lens 22 and certain other elements described below, is also conjugate to an entrance aperture 24 of a photodetector 26.

More specifically, the output of the laser 18 travels through a beam expander 28 having an internal focal plane 30 that, like the detector's entrance aperture, is also conjugate to the single spot in the image plane 16, and the laser beam thus expanded is directed by (in the illustrated example) two mirrors 32 and 34 to a dichroic mirror 36, which passes the laser light through a scanner assembly 38 to be described below. The scanner assembly 38 forwards the light through the scan lens 20 and the objective 12. The reflected light returns through the objective 12, the scan lens 20, and the scanner assembly; i.e., the incoming- and reflected-light paths share a common path segment. The two paths branch at the dichroic mirror 36, by which the returning light is reflected through the detector lens 22 to the detector 26.

The purpose of the scanner 38 is to deflect both the incoming light from the laser 18 and the reflected light from the object plane 14 and thereby move the spot in the image plane 16—and thus in the object plane 14—to which both the beam-expander focal point 30 and the detector aperture 24 are conjugate. The scanner typically moves this point in a raster-scan fashion, and a raster-scan display 40 operated in synchronism with the scanner 38 displays the resulting detector output.

Such an arrangement has significant performance advantages, as those skilled in the art recognize. Among these, for instance, is that the detector aperture 24 can function as a pinhole, providing spatial filtering to improve resolution, as can a corresponding aperture placed in the beam-expander focal plane 30. Additionally, since only a very small part of the object plane is illuminated at any one time, very little light from other object-plane locations is available to be imaged, because of optical-system distortions, to the detector pinhole and thus act as noise. Another advantage is the considerable light efficiency that results: the power required to illuminate an object in a scanning-type microscope is a very small fraction of that required to obtain the same level of illumination in a conventional microscope. Moreover, because such an illumination approach makes it practical to achieve a high instantaneous light intensity at the target spot, certain desirable imaging techniques, such as those that employ fluorescence, tend to be more practical than they would otherwise be.

By employing high-numerical-aperture objectives, confocal microscopes are particularly well adapted to forming three-dimensional images of semi-transparent objects such as biological samples. The microscope takes a series of two-dimensional "slices," each taken at a different depth into the sample. The slices thus taken can be viewed sequentially or processed by computer to generate slices through the sample at different angles. By employing similar techniques, high-resolution images of non-flat opaque objects can also be taken.

Figure 2:
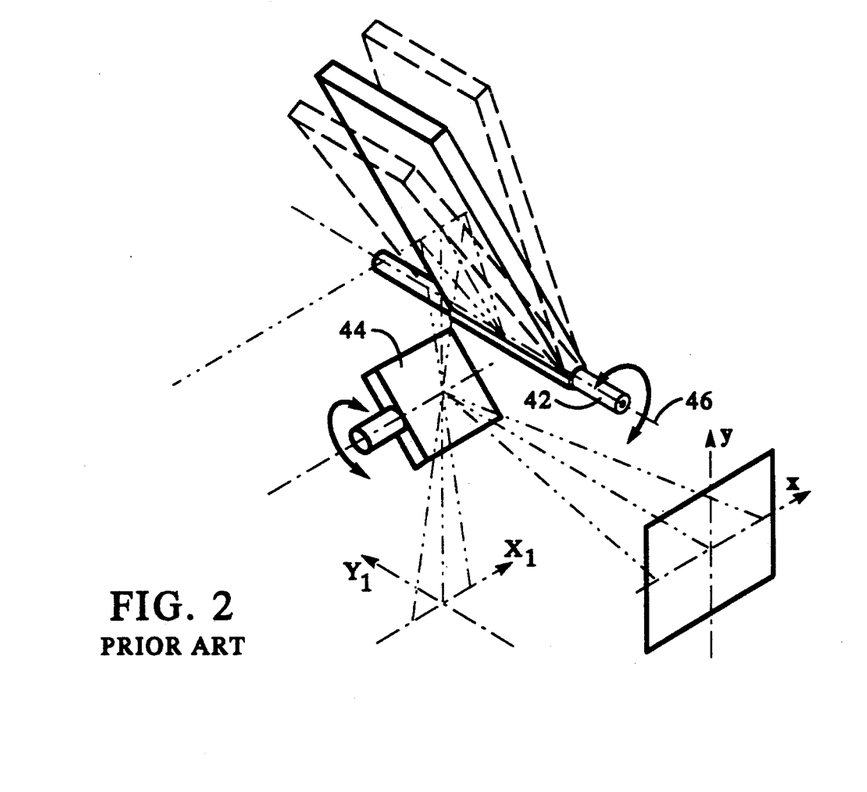
FIG. 2, previously described, is an isometric view of a prior-art scanner assembly for a confocal microscope.

However, certain difficulties arise because of the scanner mechanism. FIG. 2 depicts a typical scanner mechanism. It includes a first deflection mechanism in the form of a galvanometrically driven mirror 42 that so pivots as to cause the target spot to move in directions parallel to an axis that can be called the x axis. In doing so, mirror 42 deflects the laser beam to a similarly driven second mirror 44, which causes movement of the target spot in directions parallel to an orthogonal, y axis. In the illustrated scanner mechanism, mirror 44 pivots about an axis that extends through its center, while mirror 42 pivots in a "paddle" fashion about an axis 46 spaced from the mirror surface. The result of this arrangement is that, although the angle at which light from the laser source is reflected from mirror 42 varies, the location at which that returning beam hits mirror 44 does not change appreciably. Consequently, mirror 44, which must be pivoted many times as quickly as mirror 42, can be kept relatively small.

Despite this small size, it is difficult to obtain the speed necessary to meet the rather severe requirements to which confocal microscopes can be subject. Because of the multiple scanning mentioned above, the acquisition time for a complete image can be objectionably long unless each raster scan is extremely fast. Moreover, confocal microscopes tend to be quite expensive, and it is desirable to mitigate this tendency to a degree by employing as few specialized parts as possible. It is thus beneficial to make the mechanical scanning compatible with television scanning rates, which are quite high. This will be particularly true when compatibility with high-definition television becomes desirable.

These difficulties apply not only to confocal microscopes, which provide scanning in the paths both from the source and to the detector, but also to some other types of scanning microscopes, which provide scanning in only one of the paths.

SUMMARY OF THE INVENTION

I have recognized that much of the difficulty of making confocal and other scanning microscopes from conventional components results from the apparent need to employ non-resonant scanning. In non-resonant scanning, the scanner is one that is so driven that the scanner motion follows the drive signal more or less faithfully. The scan frequency obtainable from such scanners for a given cost and power level is much lower than that which is obtainable from resonant scanners, which operate near their mechanical resonances and thus do not faithfully follow their drive signals. The apparent need for non-resonant scanning arises from the fact that a scanning-type microscope is often required to provide a panning function, which resonant scanners cannot readily provide. Additionally, unless the target spot performs the type of constant-speed motion most readily provided by non-resonant scanning, the light source must be specially modulated in accordance with the scan so that the illumination has the uniformity required, for example, by luminescence applications.

My invention is an arrangement that makes the use of resonant scanners feasible in such applications. According to one aspect of the invention, a confocal microscope employs a scanner system in which the deflector assembly for one axis has a plurality of resonant frequencies, one of which is the fundamental scan frequency and at least one other of which is a harmonic of that frequency. The resulting deflection can be made nearly linear even though the deflector assembly is resonantly driven. Consequently, the high-speed capability of resonant scanning can be employed in a confocal microscope.

In accordance with another aspect of the invention, a confocal or other scanning-type microscope can scan resonantly even though it requires a panning capability. In accordance with this aspect of the invention, both multiply resonant and nonresonant drives are employed for deflection along the same axis. The resonant-scanner housing, for instance, can be rotated by a galvanometer or other motor to provide panning in the resonant-scan direction. Alternatively, a second, non-resonantly driven mirror can be provided for deflection along the same axis, again to superimpose the non-resonantly produced motion on the motion produced resonantly.

Superimposing harmonically related resonant motions has been proposed in the past for other applications, but previous approaches encountered certain difficulties. These resulted from the fact that precise phase and amplitude relationships must be maintained among the various harmonic components. While modulation of resonant-scanner amplitude at the (relatively low) required rates is not difficult, conventional ways of maintaining the desired phase relationship present problems. The reason for this is that the phase relationship between the driving signal and the resonant motion is extremely sensitive to the difference between the driver-signal frequency and the natural frequency of the (typically high-Q) scanner. In particular, an abrupt change of nearly 180° in the phase difference between the drive signal and the scanner motion occurs when the natural frequency drifts between values only slightly above and below the driving frequency because of, say, age or environmental factors such as temperature.

In accordance with a further aspect of my invention, however, one of the scanners for a given axis of motion is tunable, and the phase relationship between the two harmonically related resonances is maintained, not by adjusting the drive signal, but rather by adjusting the tunable scanner's resonant frequency. It turns out that this approach provides much more-stable control of the phase relationship between sinusoidal motion components and thus makes it more practical to use resonant scanners for linear scanning.

BRIEF DESCRIPTION OF THE DRAWINGS

These and further features and advantages of the present invention are described in connection with the accompanying drawings, in which.

DETAILED DESCRIPTION OF ILLUSTRATIVE EMBODIMENTS

According to one embodiment of the present invention, the scanner assembly 38 of the confocal microscope 10 of FIG. 1 resonantly provides substantially linear scanning in the x direction by employing an x-axis deflector assembly comprising two scanners 50 and 52 (FIG. 3) that oscillate, in a manner that will be described below, at harmonically related frequencies. For instance, scanner 50 may be a 2-kHz resonant scanner, while scanner 52 may be a 6-kHz resonant scanner. These frequency components are the two highest-amplitude frequency components of a 2-kHz triangular wave. If the phases and amplitudes of those two scanners' motions are properly related, therefore, they cause an x deflection that approximates triangular—i.e., substantially linear—motion of the target spot as a function of time.

Even though the illustrated embodiment employs only two of the Fourier components, the resultant approximation of a triangular wave is quite good. The Fourier expansion of a rectangular wave of period T and positive and negative amplitudes of unity—i.e., a peak-to-peak amplitude of two—is given by the following:

$$A(t) = \frac{8}{\pi^2} \sum_{n=1,3,\ldots}^{\infty} \frac{(-1)^{(n-1)/2}}{n^2} \sin \frac{2n\pi t}{T}.$$

From this equation, it is apparent that omission of the fifth harmonic results in an error, due to the absence of that harmonic, of $(8/\pi^2)(1/5^2) = 0.0324$, or less than 2% of the peak-to-peak amplitude of the rectangular wave. Indeed, it can be shown that omission of all higher harmonics actually makes the error less than this. Thus, a good approximation to the desired wave shape results even from the use of only two harmonics. Of course, such accuracy does not result from only two harmonics for every wave shape. In particular, a sawtooth wave requires many more harmonics to obtain the same degree of accuracy. However, the principle is the same: a non-sinusoidal periodic deflection wave form can be achieved by employing a plurality of resonant scanners whose resonant frequencies are harmonically related.

Figure 3:
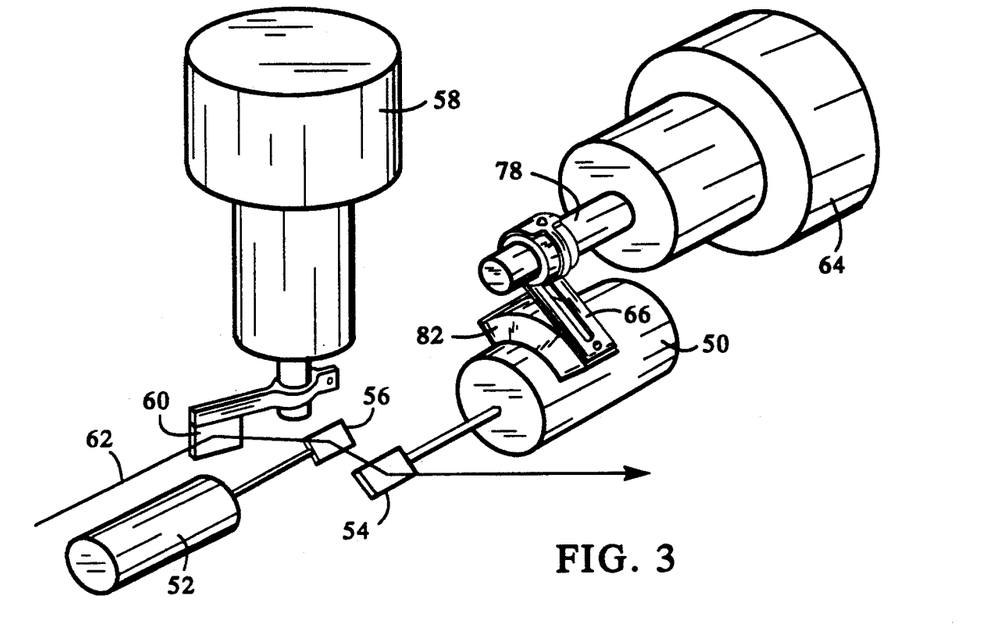
FIG. 3 is a simplified isometric view of a scanner employed in one embodiment of the present invention.

In the illustrated embodiment, the y-axis motion is produced by a galvanometer scanner 58 arranged in a "paddle" configuration, i.e., so that the light beam hits mirror 60 at a point spaced from that mirror's pivot axis. Pivoting of mirror 60 changes not only the angle at which the incoming and outgoing beams 62 thus are deflected but also the point on the mirror 60 at which those beams hit it. The arrangement is such as to minimize the resultant motion of the points at which the beams hit x-axis mirrors 54 and 56—the beam appears to pivot about a "fulcrum" between mirrors 54 and 56—so that the sizes of those mirrors can be kept to a minimum, as is desirable for high-frequency resonant scanners. As is explained in U.S. Pat. No. 5,048,904 to Montagu for a Two-Mirror Scanner with Pincushion Error Correction, this placement of the resonant scanners 50 and 52 between the galvanometer scanner 58 and the (typically field-flattening) objective 12 (FIG. 1) yields an arrangement in which it is feasible to correct for the so-called pincushion distortion of the raster shape that otherwise would occur.

By thus employing harmonically related resonances, it is possible to obtain the high scan rates necessary for use with conventional and high-definition displays while also obtaining the linear scanning that is particularly important for certain fluorescent microscope applications.

As was stated above, however, it is also desirable in many confocal microscopes to provide zooming and panning. Zooming, of course, is readily afforded by simply adjusting the amplitude of the scanner motion. And panning—i.e., changing the position of the center of the image—is readily provided in the y-axis direction by appropriate control of the galvanometer scanner 58. Panning in the x direction is not as straightforward, however, because scanners 50 and 52 are resonant scanners and thus do not lend themselves to the addition of a "DC component" to their motion.

According to the present invention, however, a further scanner 64 is included in the x-axis deflector assembly. This scanner is a galvanometer scanner and is used to superimpose a "DC" panning motion on the resonant motion that scanners 50 and 52 provide. Scanner 50 is rotatably mounted so that galvanometer scanner 64 can pivot it by means of a motion reducer 66, which reduces the apparent moment of inertia of scanner 50 as seen by scanner 64.

Figure 4A:
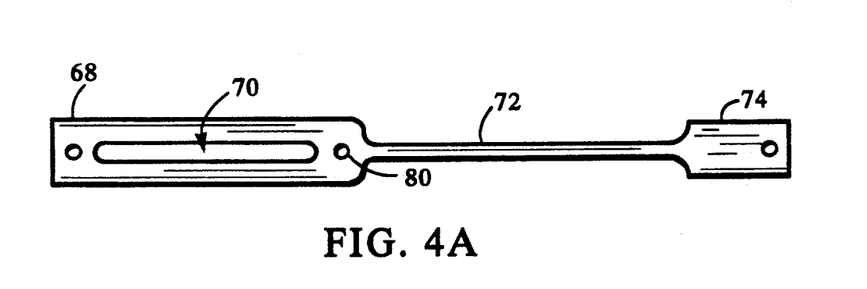
FIGS. 4A and 4B depict the gear reducer employed in the scanner assembly of FIG. 3.
Figure 4B:
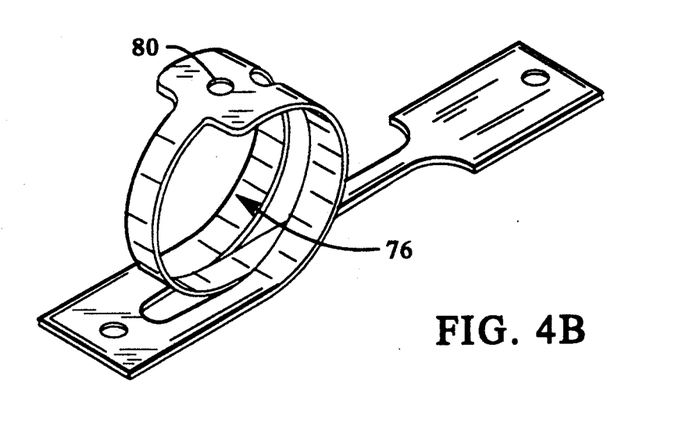

The motion reducer includes an elastic band 68 shown in more detail in FIGS. 4A and 4B. As that drawing shows, the band forms a slot 70 and a complementary neck region 72, and a tongue 74 is inserted through the slot 70 to form a loop 76, as FIG. 4B indicates. The shaft 78 of galvanometer scanner 64 is inserted through the loop 76, and the band 68 is secured to the shaft 78, such as by staking through an opening 80. The ends of the band 68 are then stretched along the surface of an arcuate fin 82 on the housing of resonant scanner 50 and secured at its ends. Because of the resilience of strip 68, the coupling provides negligible backlash.

In the embodiment of FIG. 3, it is preferable for the resonant scanner 50 to which the galvanometer 64 is coupled to be of the "reactionless" type exemplified by the scanners described in U.S. Pat. No. 4,919,500 to Paulsen. As is well known to those skilled in the art, the resonant motion of a resonant scanner arises largely from the exchange of energy between the motion of a mass—primarily the mirror—and the deflection of a resilient member to which the mass is attached. In conventional resonant scanners, the resilient member is secured in some way to the scanner housing. The result is that a structure, such as the galvanometer scanner 64 of FIG. 3, to which the resonant-scanner housing is attached must bear not only the torque that results from the motor force but also the much greater torque that results from the force of the resilient member against the housing.

Figure 5:
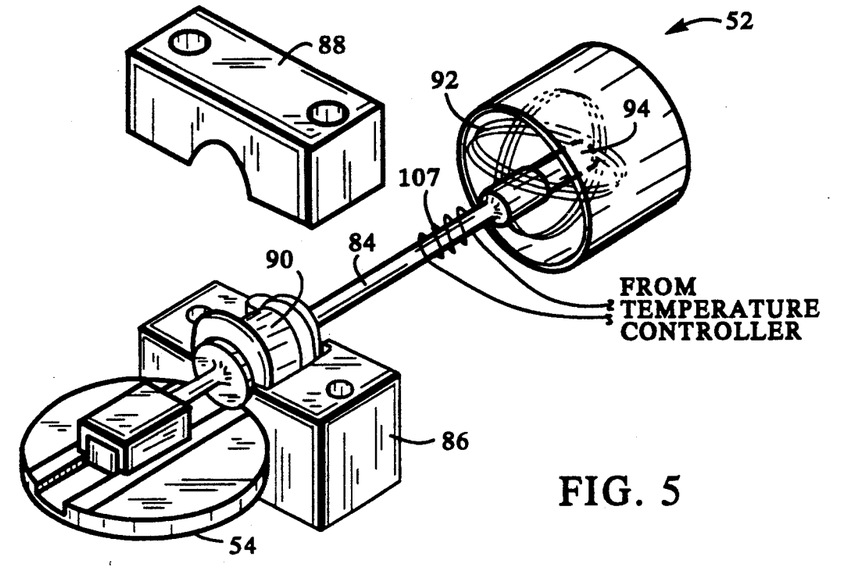
FIG. 5 is a cross-sectional view, with parts broken away, of the reactionless scanner employed in the scanner assembly of FIG. 3.

In contrast, a reactionless resonant scanner is arranged in a manner depicted in FIG. 5. As that drawing shows, the shaft 84 on which the mirror 54 is mounted is substantially supported only by housing pieces 86 and 88, which support it at the position of an enlarged mount region 90. The mirror 54 is driven by a motor comprising windings 92 mounted on the housing and a magnetic pole piece 94 on the shaft 84. The shaft 84 is made of resilient material, and the relationship of its torsional spring constant to the moment of inertia of the mirror 54 is such as to result in mirror motion that is approximately 180° out of phase with that of the pole piece (rotor) 94 when the scanner is driven at its intended, resonant frequency; that is, the torsional deformation of the shaft 84 results from the opposed motion of its opposite ends. The shaft is so arranged that the enlarged region 90 at which the housing supports it is a node of this resonant motion: the amplitude of the shaft's twisting motion is essentially zero at that point, increasing (in opposite directions) with distance from that point to maxima at the opposite ends of the shaft. In this way, the high torques involved in the resonant motion are not transmitted to the housing, and this greatly reduces the torque required of the galvanometer scanner 64.

Figure 6:
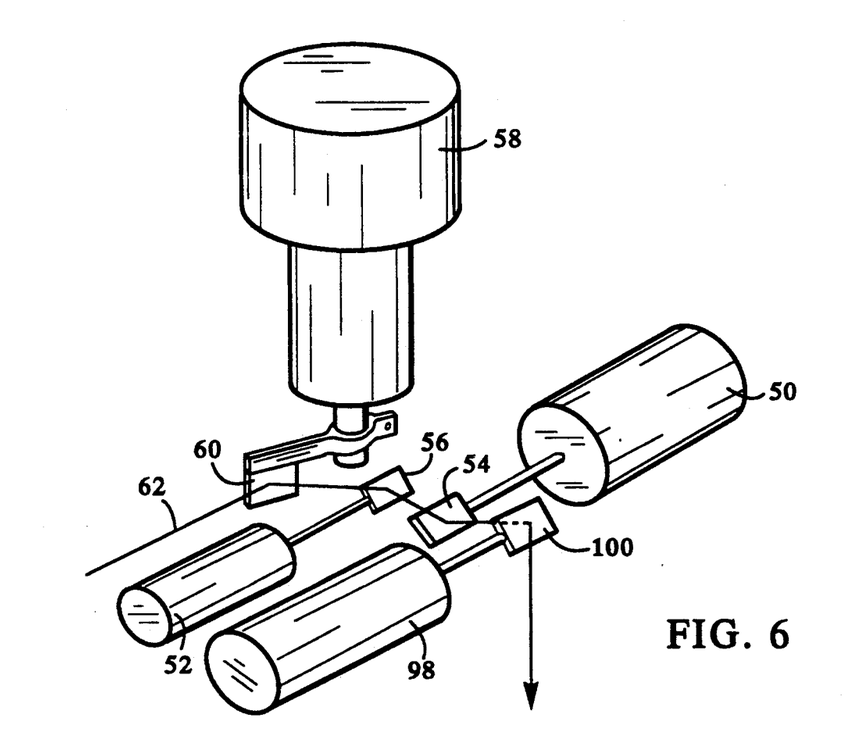
FIG. 6 is a simplified isometric view of the scanner assembly in an alternate embodiment of the present invention.

In order to avoid the above complexities that arise from the mechanical coupling between galvanometer scanner 64 and resonant scanner 50, one may prefer an arrangement of the type depicted in FIG. 6, in which identical components are provided with identical reference numerals. In the arrangement of FIG. 6, panning is produced not by rotating the housing of resonant scanner 50 but rather by deflecting the beam with a galvanometer scanner 98, whose mirror 100 is disposed in the light path. Thus, the x-axis deflector includes three mirrors 54, 56, and 100 rather than only two.

Of course, although the drawings depict only two resonant scanners, one of which resonates at the third harmonic of the frequency at which the other does, further scanners can be provided to add other harmonics so as to increase the accuracy with which the triangular wave shape is approximated or to produce other wave shapes. The illustrated embodiment employs only an odd harmonic because the Fourier series for a symmetrical triangular wave has only odd harmonics, but other harmonic combinations are required, in accordance with basic Fourier-transform theory, for other periodic wave shapes.

Additionally, although I prefer to employ singly resonant individual scanners for this purpose, one can in principle replace the separate singly resonant scanners with a single multiply resonant scanner. U.S. Pat. No. 4,859,846 to Burrer, for example, describes the operation of such a scanner, and one might employ such a scanner, possibly with the control system employed there, to carry out the teachings of the present invention.

Figure 7:
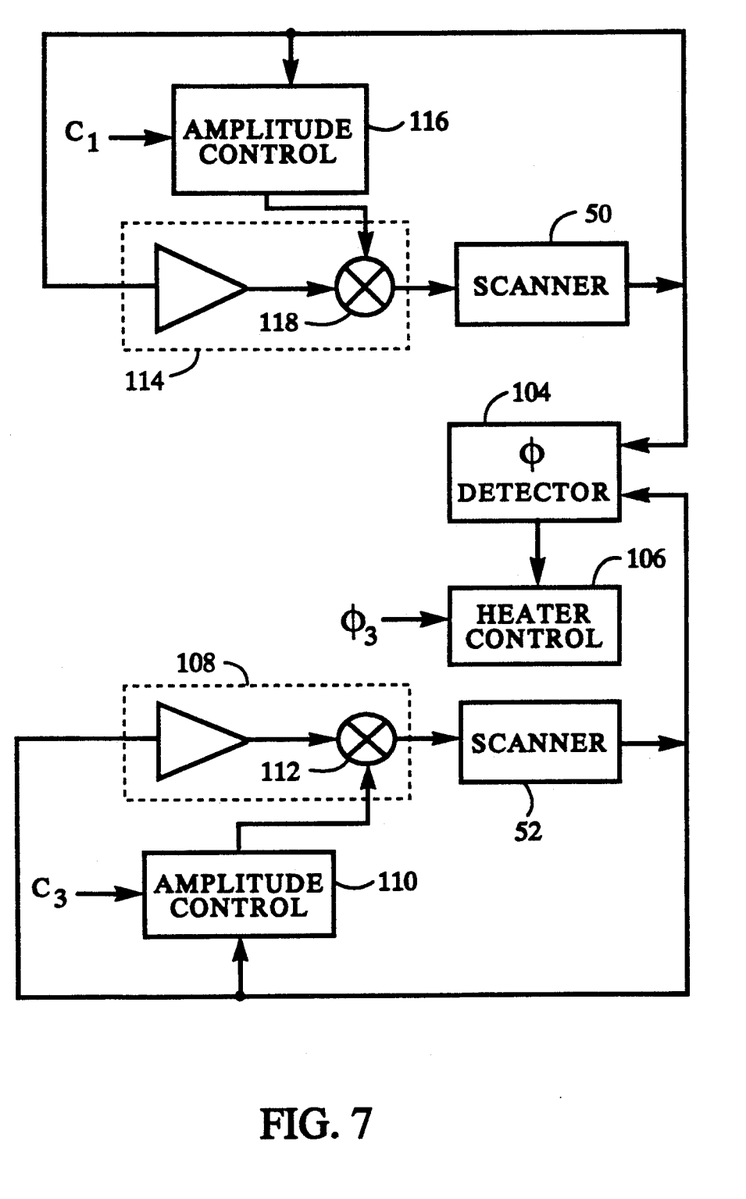
FIG. 7 is a block diagram of the control system for maintaining the proper phase relationship between the two harmonically related residences of the scanner assembly of either FIG. 3 or FIG. 6.

However, I prefer a type of control system depicted in FIG. 7. As was explained above, one of the difficulties that had previously been encountered in controlling deflector assemblies with harmonically related resonances is that the relative phases of the resonant motion components are difficult to control, because the phase relationship between the drive signal and the motion of a high-Q scanner near resonance can undergo drastic changes as a result of small variations in factors such as age, wear, and ambient temperature. I solve that problem in the control system of FIG. 7 by controlling phase, not by direct control of the drive-signal phase, but rather by tuning a tunable scanner, preferably in a manner analogous to that employed in conventional phase-locked loops.

As is conventional, a phase detector 104 determines the phase difference between the (position or velocity) outputs of scanners 50 and 52. That is, the phase detector 104 generates an output proportional to the difference between the times of occurrence of a zero crossing of the fundamental component and of an adjacent zero crossing of the harmonic component. The resultant phase-difference output is employed to control the phase (and, effectively, the frequency) of scanner 52. Instead of being used to generate a drive signal for the scanner 52, however, this phase difference is instead employed by a heater circuit 106 to vary the current that flows through a heating element 107 (FIG. 5) that surrounds the scanner shaft 84. The spring constant of the shaft 84 depends on its temperature, and the scanner's resonant frequency therefore does, too. By controlling the heater current in response to the phase difference between the two scanners, one can maintain their proper phase relationship without suffering the difficulties that result from attempting to do so by directly controlling the drive-signal phase.

Indeed, the drive signal applied to the scanner driver 108 in the FIG. 7 arrangement does not come from a separate signal generator but instead is derived by positive feedback of scanner 52's output. Because of the positive feedback, the loop comprising the scanner 52 and its driver 108 exhibits a low-amplitude instability: that system self-oscillates, its amplitude continually increasing until driver 108's internal amplifiers reach saturation. To achieve the proper, predetermined amplitude set by the Fourier coefficient $C_3$ for the third harmonic, an amplitude-control circuit 110 adjusts an attenuator 112 so as to attenuate the saturated-amplifier output.

In the illustrated embodiment, scanner 50 is simply arranged to self-oscillate by similar feedback to its driver 114, and an amplitude controller 116 employs a similar attenuator 118 to maintain the amplitude dictated by the Fourier coefficient $C_1$ for the fundamental component.

An equivalent system replaces the heating element 107 with the coils of a magnetic spring that acts between the scanner's shaft and housing. Such a spring may be of the type described in U.S. Pat. No. 4,959,568 to Stokes, which I hereby incorporate by reference. Such systems tend not to provide as broad a resonant-frequency range as heating-element-type tunable scanners do, but their resonant frequencies can usually be changed more rapidly.

Figure 8:
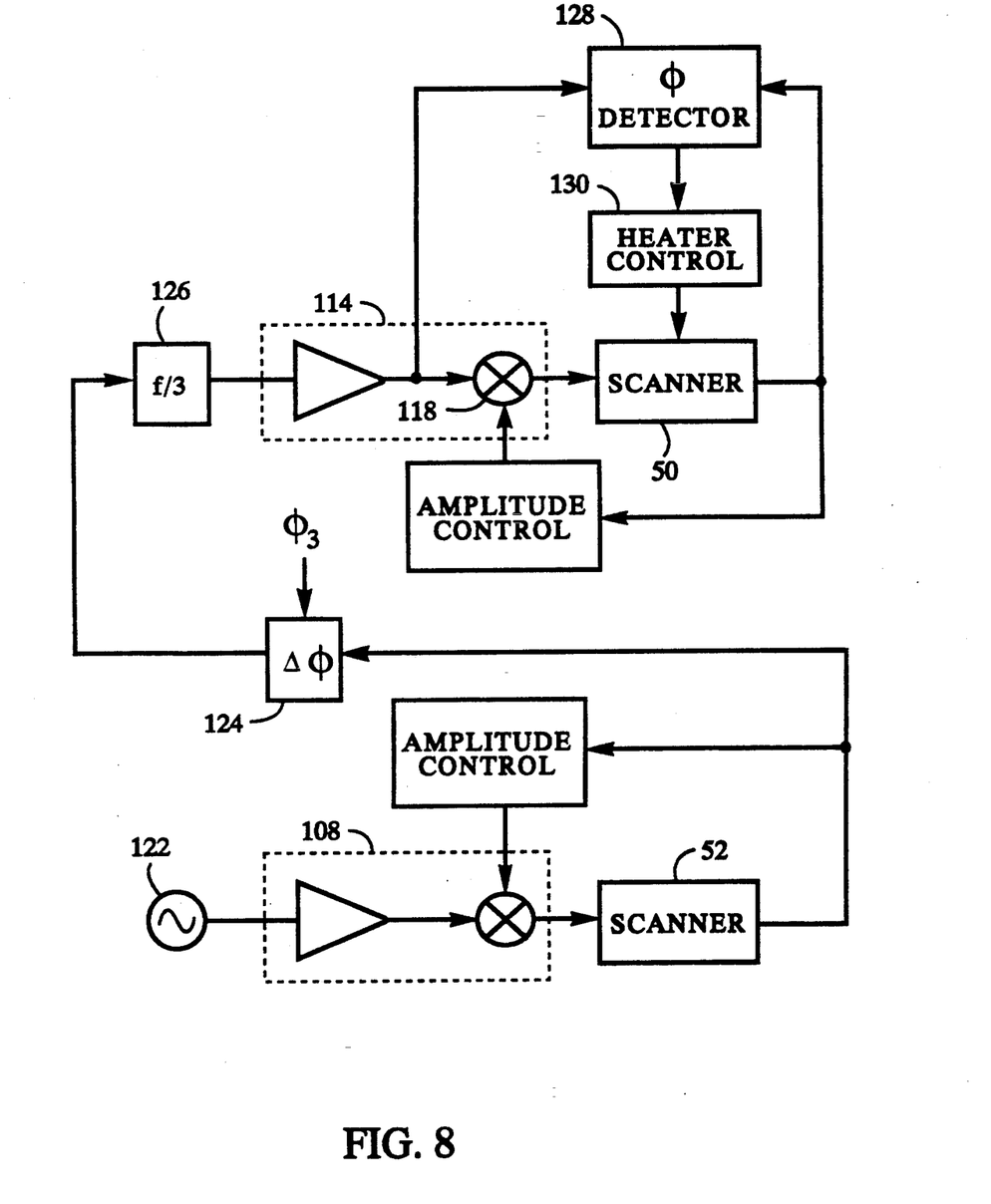
FIG. 8 is an alternate embodiment of the control system.

Although I prefer the arrangement of FIG. 7, FIG. 8 depicts a control scheme that demonstrates the breadth of applicability of the tunable-scanner approach. In this arrangement, a free-running oscillator 122 provides the input to the driver 108 of scanner 52; that is, scanner 52 does not self-oscillate with its driver in this arrangement, and it accordingly does not automatically seek its system resonance, although the oscillator 122 will be arranged to drive scanner 52 as near to that resonance as is convenient. The scanner output is applied, possibly after some phase adjustment in a phase shifter 124, to a frequency divider 126 whose output frequency is one-third its input frequency. The frequency divider 126 applies its output to the driver 114 of scanner 50.

Accordingly, the control system of FIG. 8 maintains a constant phase relationship between the output of scanner 52 and the input to scanner 50. As was observed above, however, the relationship between the input and output of a high-Q scanner such as scanner 50 operating near resonance can vary greatly, and this has been the source of problems in previous attempts to employ multiply resonant systems to provide desired non-sinusoidal periodic signals. Without more, therefore, the phase relationship between the outputs of scanner 50 and 52 would tend to vary even though the relationship between scanner 52's output and scanner 50's input is fixed. But the control system of FIG. 8 keeps the phase relationships between the outputs constant—thus avoiding the difficulties that afflicted prior-art arrangements—by adjusting the resonant frequency of scanner 50 in response to the phase difference between the scanner's input and its output (or, equivalently, to the phase difference between the outputs of scanners 50 and 52).

Specifically, the arrangement of FIG. 8 employs a phase detector 128 similar to phase detector 104. Phase detector 128 responds to the difference between the two scanner's outputs to provide a control signal to a heater controller 130 similar to controller 106 of FIG. 7, and this controller adjusts the resonant frequency of scanner 50. In this way, the FIG. 8 arrangement maintains the proper phase relationship between the two harmonic components of the target-spot motion.

It is thus apparent that the present invention can be practiced in a wide range of embodiments and therefore constitutes a significant advance in the art.

What is claimed is:

1. An optical instrument comprising:
   A) at least one of a light source and a light detector,
   B) means defining a light path between a target spot in an object region and the source or detector, and
   C) a scanner assembly disposed in the light path and including:
      i) at least one deflector assembly associated with a deflection axis and resonant at both a first, fundamental resonant frequency and an additional, harmonic resonant frequency, which is a harmonic of the fundamental resonant frequency, and
      ii) a drive mechanism for varying the position of the target spot in directions generally parallel to the associated deflection axis by simultaneously both driving the deflector assembly nonresonantly and driving it resonantly at the fundamental and harmonic resonant frequencies, the drive mechanism including a control system for maintaining a predetermined phase relationship between the target spot's motion components at the two resonant frequencies.

2. The optical instrument as defined in claim 1 wherein the scanner assembly includes:
   A) a pivotably mounted resonant scanner whose mirror is positioned to reflect light traveling in the light path; and
   B) a motor for non-resonantly pivoting the resonant scanner.

3. The optical instrument as defined in claim 2 wherein the deflector assembly includes a resilient motion reducer that couples the motor to the resonant scanner.

4. The optical instrument as defined in claim 3 wherein the resonant scanner is a reactionless scanner.

5. The optical instrument as defined in claim 2 wherein the resonant scanner is a reactionless scanner.

6. The optical instrument as defined in claim 2 wherein:
   A) the deflector assembly includes a second resonant scanner separate from the first-mentioned resonant scanner, the resonant frequency of the first resonant scanner being one of the fundamental and harmonic resonant frequencies, the resonant frequency of the second resonant scanner being the other of the fundamental and harmonic resonant frequencies; and
   B) the drive mechanism includes separate first and second drivers for driving the first and second resonant scanners, respectively, substantially at their resonant frequencies, and a third driver for driving the motor nonresonantly.

7. The optical instrument as defined in claim 1 wherein:
   A) the deflector assembly includes both a resonant scanner and a nonresonant scanner, both of whose separate respective mirrors vary the position of the target spot in directions substantially parallel to the deflection axis; and
   B) the drive mechanism respectively drives the resonant and non-resonant scanners resonantly and non-resonantly.

8. The optical instrument as defined in claim 1 further including a microscope objective lens disposed in the light path and focused on the object region.

9. The optical instrument as defined in claim 8 wherein:
   A) the optical instrument includes both a light source and a light detector;
   B) the means defining the light path defines source and detector light paths between the target spot and the source and detector, respectively, such that the source and detector light paths have a common path segment; and
   C) the scanner assembly and objective are disposed in the common path segment.

10. A confocal microscope comprising:
    A) a light source,
    B) a light detector,
    C) a microscope objective lens for viewing an object region,
    D) means defining source and detector light paths between a target spot in the object region and the source and detector, respectively, such that the source and detector light paths have a common path segment, and
    E) a scanner assembly disposed in the common path segment and including:
        i) at least one deflector assembly associated with a deflection axis and resonant at both a first, fundamental resonant frequency and an additional, harmonic resonant frequency, which is a harmonic of the fundamental resonant frequency, and
        ii) a drive mechanism for driving the deflector assembly to vary the position of the target spot in directions generally parallel to the associated axis at the fundamental and harmonic resonant frequencies simultaneously, the drive mechanism including a control system for maintaining a predetermined phase relationship between the target spot's motion components at the two resonant frequencies.

11. The confocal microscope as defined in claim 10 wherein:
    A) the deflector assembly includes a first scanner, whose resonant frequency is the fundamental resonant frequency, and a second scanner, whose resonant frequency is the harmonic resonant frequency; and
    B) the drive mechanism includes first and second drivers for driving the first and second scanners, respectively, substantially at their resonant frequencies.

12. A confocal microscope as defined in claim 11 wherein the control system includes:
    A) a phase comparator for comparing the phases of the components of the deflector assembly's motion at the two resonant frequencies; and
    B) a resonant-frequency controller responsive to the phase comparator for so controlling one of the resonant frequencies as to maintain a predetermined phase relationship between the two resonant-frequency components.

13. The confocal microscope as defined in claim 12 wherein the resonant-frequency controller includes a heating element for heating the deflector assembly and adjusts said one of the resonant frequencies by using the heating element to heat the deflector assembly.

14. The confocal microscope as defined in claim 12 wherein the resonant-frequency controller includes a magnetic spring acting in the deflector assembly and adjusts said one of the resonant frequencies by varying the current that flows through the magnetic spring.

15. A confocal microscope as defined in claim 10 wherein the control system includes:
    A) a phase detector for generating an output representative of the phase difference between the components of the deflector assembly's motion at the two resonant frequencies; and
    B) a resonant-frequency controller responsive to the phase detector for so controlling one of the resonant frequencies as to maintain a predetermined phase relationship between the two resonant-frequency components.

16. The confocal microscope as defined in claim 15 wherein the drive mechanism is responsive to at least one resonant-frequency component of the deflector assembly's motion to cause the drive mechanism and deflector assembly to self-oscillate at that frequency.

17. The confocal microscope as defined in claim 15 wherein the resonant-frequency controller includes a heating element for heating the deflector assembly and adjusts said one resonant frequency by using the heating element to heat the deflector assembly.

18. The confocal microscope as defined in claim 17 wherein the drive mechanism is responsive to at least one resonant-frequency component of the deflector assembly's motion to cause the drive mechanism and deflector assembly to self-oscillate at that frequency.

19. The microscope as defined in claim 10 wherein the scanner assembly further includes a second deflector assembly for varying the target-spot position in directions generally parallel to a second deflection axis substantially orthogonal to the first-mentioned deflection axis.

* * * * *